US008875302B2

(12) United States Patent
Agrawal et al.

(10) Patent No.: US 8,875,302 B2
(45) Date of Patent: *Oct. 28, 2014

(54) CLASSIFICATION OF AN ELECTRONIC DOCUMENT

(75) Inventors: Sheshnarayan Agrawal, Bangalore (IN); Prasad M. Deshpande, Mumbai (IN); Mukesh K. Mohania, New Delhi (IN); Karin Murthy, Bangalore (IN); Deepak S. Padmanabhan, Kochi (IN)

(73) Assignee: International Business Machines Corporation, Armonk, NY (US)

( * ) Notice: Subject to any disclaimer, the term of this patent is extended or adjusted under 35 U.S.C. 154(b) by 235 days.

This patent is subject to a terminal disclaimer.

(21) Appl. No.: 13/471,971

(22) Filed: May 15, 2012

(65) Prior Publication Data

US 2013/0312105 A1 Nov. 21, 2013

(51) Int. Cl.
G06F 21/62 (2013.01)

(52) U.S. Cl.
CPC ............ *G06F 21/62* (2013.01); *G06F 21/6218* (2013.01)
USPC ............ 726/26; 726/1; 726/2; 726/4; 726/27; 726/28; 713/166; 713/167; 707/783; 707/694; 715/200

(58) Field of Classification Search
CPC .............. G06F 21/62; G06F 17/30675; G06F 21/6254; H04L 63/0428
USPC .............. 726/1, 2, 4, 16, 19, 26–28; 707/694, 707/783; 713/166, 167; 715/200
See application file for complete search history.

(56) References Cited

U.S. PATENT DOCUMENTS

| 7,428,701 | B1 | 9/2008 | Gavin et al. |
| 7,831,571 | B2 | 11/2010 | Roy et al. |
| 7,934,249 | B2 | 4/2011 | Chan et al. |
| 2005/0154746 | A1* | 7/2005 | Liu et al. ........................ 707/101 |
| 2006/0075228 | A1* | 4/2006 | Black et al. ................... 713/167 |
| 2009/0112867 | A1 | 4/2009 | Roy et al. |
| 2010/0325722 | A1 | 12/2010 | Uchida |
| 2011/0004606 | A1* | 1/2011 | Aumann et al. .............. 707/759 |

FOREIGN PATENT DOCUMENTS

WO 2011062743 A2 5/2011

OTHER PUBLICATIONS

U.S. Appl. No. 13/903,095, entitled "Classification of an Electronic Document" filed May 28, 2013.
"Appligent Document Solutions-Redax," Copyright © 2011 Appligent, Inc., retrieved on Jan. 12, 2012 <http://www.appligent.com/redax>.
"Appligent Document Solutions-Redax," Copyright © 2011 Appligent, Inc., printed Jan. 18, 2012 <http://www.appligent.com/redax>.
"InfoRazor-Sanitize Documents with Automatic PDF / Redaction Secure and Easy to Use / Free Trial Offer from Code Origami Software", retrieved on Jan. 12, 2012, printed main page of URL on May 8, 2012 <http://www.codeorigami.com/aboutus.htm>.

* cited by examiner

*Primary Examiner* — Venkat Perungavoor
*Assistant Examiner* — Amir Mehrmanesh
(74) *Attorney, Agent, or Firm* — Derrick J. Carman; Mohammed Kashef (57) ABSTRACT

A computer receives an electronic document that includes a group of terms. The computer sends the electronic document to an information extraction program that extracts specific terms from the group of terms. Each of the specific terms that match to a certain extent with one of the attribute values in an electronic dictionary is identified. A value associated with the electronic document is generated based on the specific terms that match, and on an end-user that is attempting to access the electronic document.

14 Claims, 6 Drawing Sheets

CLASSIFICATION OF AN ELECTRONIC DOCUMENT

BACKGROUND

1. Field of the Invention

The present invention relates generally to controlling access to an electronic document that has unstructured data, and more specifically to classifying the electronic document based on information within the electronic document, associated structured data, and a particular end-user that is attempting to access the electronic document.

2. Description of the Related Art

People within organizations such as banks, hospitals, and large companies often have access to various electronic documents that contain unstructured data. The unstructured data may include personal addresses, dates, social security numbers, credit card numbers, and other sensitive or non-sensitive information. Moreover, an electronic document containing sensitive information can pass through a workflow management system or can be stored in a repository, wherein multiple people having different roles obtain access to the electronic document at different times. Therefore, an electronic document containing sensitive information can be vulnerable to unauthorized use if access to the electronic document is not properly controlled.

It is known to protect sensitive information within an electronic document by redacting part of a document or preventing complete access to the document. For example, a computer program can search a document and utilize a regular expression to identify sensitive information having an expected pattern that corresponds to a person's social security number, medical history, and/or salary. Subsequently, the sensitive information that was identified, using the regular expression, can be redacted.

It is also known to utilize an electronic dictionary having a array of sensitive words to identify information within an electronic document that is potentially sensitive. Particularly, a program can utilize the electronic dictionary to perform comparisons that can identify information within the electronic document that matches with at least one of the sensitive words in the array. Subsequently, the information identified can be redacted.

However, utilizing a regular expression and/or an electronic dictionary to identify sensitive information and subsequently redacting the sensitive information within the electronic document is not sufficient for satisfying the needs of all end-users, because certain end-users may need access to the information that is redacted even though other end-users should not have access to the information for security reasons. Accordingly, it is desirable to classify an electronic document in order to selectively control access to the electronic document based on a particular end-user attempting to access the electronic document.

SUMMARY

Aspects of an embodiment of the present invention disclose a method, computer system, and program product for generating a value associated with an electronic document. A computer receives an electronic document. The computer receives data that identifies an end-user that is attempting to access the electronic document. The computer associates scores with terms within the electronic document. The computer generates a value associated with the electronic document based on the associated scores, wherein the value is specific to the end-user.

BRIEF DESCRIPTION OF THE SEVERAL VIEWS OF THE DRAWINGS

The subject matter that is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a document sensitivity computing program to generate a value associated with an electronic document, based on information within the electronic document, associated structured data in a master data management system, and a particular end-user that is attempting to access the electronic document. The value that is generated by the document sensitivity computing program is utilized to classify the electronic document for purposes that include data security.

Historically, sensitive information within an electronic document was blocked by redacting parts of the electronic document that contain the sensitive information or preventing complete access to the electronic document, regardless of the particular end-user that was trying to access the electronic document. Typically, a computer program for performing redaction of an electronic document can parse the electronic document for specific patterns corresponding to sensitive information, and block access to information within the electronic document that closely matches the patterns. However, blocking access to information within the electronic document without considering the particular end-user who is trying to access the electronic document is insufficient for an enterprise in which certain end-users may need to access the information, even though other end-users may not need to access the information. Thus, in one embodiment of the disclosure there is a need to generate a value associated with an electronic document based on information within the electronic document and the particular end-user that is attempting to access the electronic document. The value can be subsequently utilized to perform further action, for example, redaction of the electronic document and/or notification to a system programmer/administrator of attempted access to the electronic document.

Figure 1:
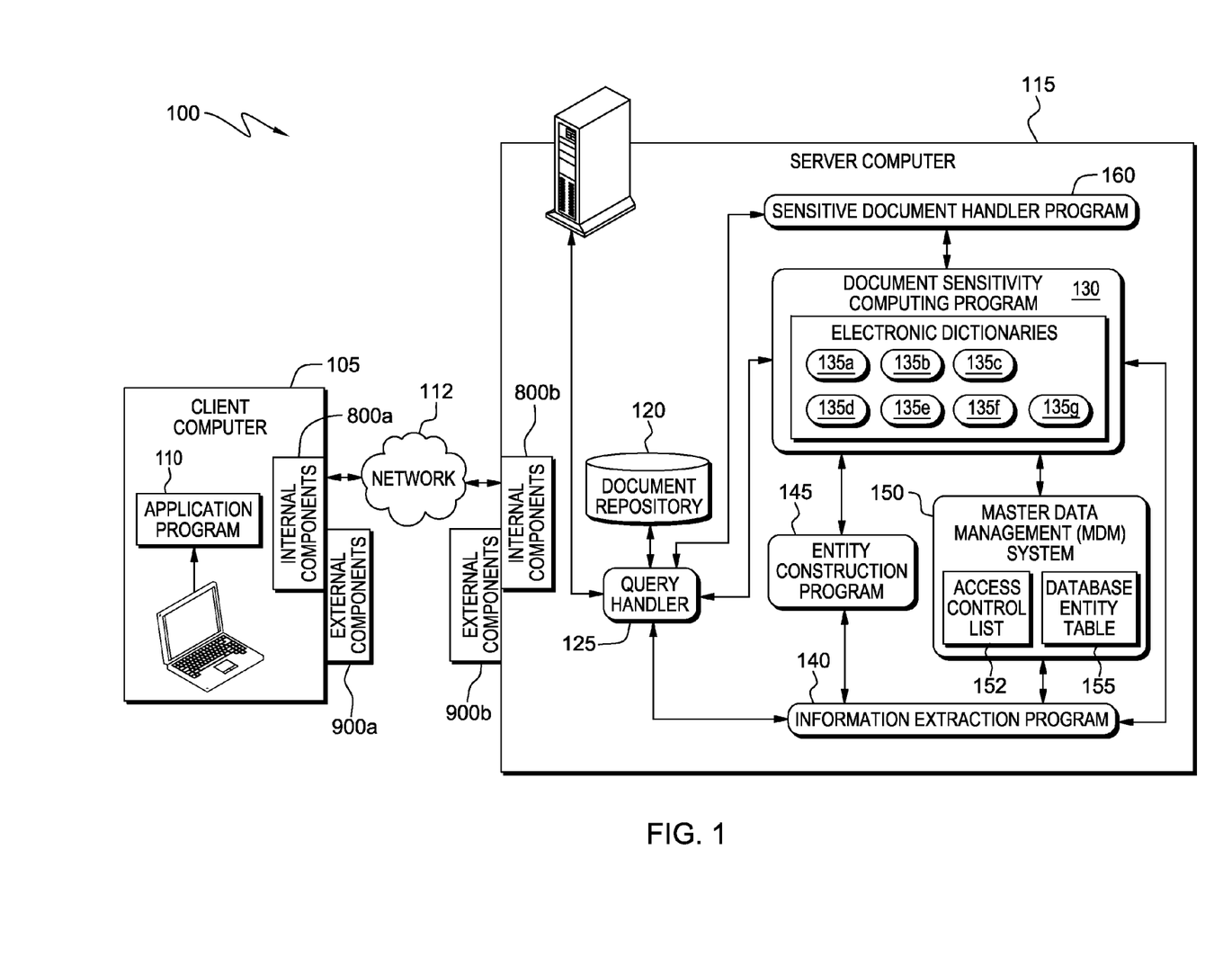
FIG. 1 is a block diagram of a computer system having an document sensitivity computing program for generating a value associated with an electronic document based on information within the electronic document, associated structured data in a master data management system, and a particular end-user that is attempting to access the electronic document, wherein the value is utilized to classify the electronic document according to an embodiment of the present invention.

FIG. 1 illustrates computer system 100 that includes client computer 105 connected to server computer 115 via network 112. Client computer 105 and server computer 115 each include respective internal components 800a and 800b, and respective external components 900a and 900b, as described below in more detail with respect to FIG. 5.

Client computer 105 includes application program 110 that can be utilized to access electronic documents within computer system 100. Server computer 115 includes: document repository 120, query handler 125, document sensitivity computing program 130 having electronic dictionaries 135a-135g, information extraction program 140, entity construction program 145, master data management (MDM) system 150 having access control list 152 and database entity table 155 with rows and attribute columns that contain structured data, and sensitive document handler program 160.

In the disclosed embodiment, document repository 120 is a storage device that is capable of storing electronic documents such as freeform plaintext files or other types of files containing unstructured data. Unstructured data as used herein refers to information within an electronic document that lacks a fixed or readily understood pattern, wherein pieces of the information are not organized in a fixed schema such as in a relational database and therefore are not individually accessible via a query of document repository 120. For example, unstructured data within an electronic document, stored in document repository 120, may include a combination of information such as personal addresses, birthdates, social security numbers, credit card numbers, bank account numbers, words and sentences (i.e., freeform text), and other sensitive or non-sensitive terms.

Often times, a particular end-user within an enterprise may need to retrieve and access an electronic document in document repository 120, for example, as part of an enterprise software workflow that includes various stages of processing the electronic document. Query handler 125 is a software application that can be utilized to retrieve the electronic document for the particular end-user who using application program 110 to request the electronic document. Specifically, query handler 125 can receive a data request for the electronic document from application program 110 via client computer 105 and network 112, and invoke a computer command to retrieve the electronic document from document repository 120, in response to receiving the data request. Specifically, the data request contains data that identifies the particular end-user and the electronic document that the particular end-user is attempting to access. The data that identifies the particular end-user can be utilized by document sensitivity computing program 130 to perform a lookup operation on access control list 152, wherein the lookup operation can determine data access rights of the particular end-user.

In the disclosed embodiment, an objective is to have document sensitivity computing program 130 generate a value associated with the electronic document that is retrieved. The value associated with the electronic document is based on information within the electronic document, associated structured data in MDM system 150, and data access rights of the particular end-user that is attempting to access the electronic document. The data access rights are defined in access control list 152, wherein access control list 152 is a list within a file that resides on MDM system 150. The value associated with the electronic document can be utilized to classify the electronic document for data security purposes that include redaction of the electronic document and/or notification to a system programmer/administrator of the particular end-user's attempted access to the electronic document.

However, before document sensitivity computing program 130 can generate the value associated with the electronic document, specific terms that are potentially sensitive need to be extracted from the electronic document. Thus, query handler 125 sends the electronic document to document sensitivity computing program 130. Next, document sensitivity computing program 130 sends the electronic document and sets of rules to information extraction program 140 in order to extract the specific terms. Information extraction program 140 is a software program having functionality that can receive the electronic document and sets of rules, and utilize the sets of rules to extract the specific terms from the electronic document. In the disclosed embodiment, the sets of rules are generated by document sensitivity computing program 130, wherein document sensitivity computing program 130 is configured by the system programmer/administrator to send the sets of rules to information extraction program 140. The sets of rules can be based on electronic dictionaries 135a-135g or regular expressions. A regular expression is program code that is utilized to search for strings of text such as specific terms or patterns of characters and/or numbers. For example, in the disclosed embodiment, a regular expression is used to identify the specific terms in the electronic document that match to structured data represented in the attribute columns of database entity table 155.

For the sets of rules based on electronic dictionaries 135a-135g, the information extraction program 140 uses a fuzzy matching technique. The fuzzy matching technique can identify the specific terms that match to a certain extent with attribute values within one of electronic dictionaries 135a-135g. In addition, the fuzzy matching technique can even identify the specific terms that match to a certain extent with attribute values within one of electronic dictionaries 135a-135g, wherein the specific terms are misspelled or have a typographical error. The specific terms that match to a certain extent with attribute values within one of electronic dictionaries 135a-135g are hereinafter also referred to as the identified terms.

Furthermore, each of electronic dictionaries 135a-135g is generated by document sensitivity computing program 130 and is an array of attribute values that are represented in an attribute column of database entity table 155 within MDM system 150. MDM system 150 is a centralized repository that contains structured data consolidated from a variety of sources, and provides a single view of the structured data. Thus, each of electronic dictionaries 135a-135g and attribute values within electronic dictionaries 135a-135g are associated to an attribute column of database entity table 155. The associations of each of electronic dictionaries 135a-135g, attribute values within electronic dictionaries 135a-135g, and an attribute column of database entity table 155 can be determined by program code functionality of document sensitivity computing program 130.

In addition, each attribute column of database entity table 155 is associated to a column position index and a column score, wherein the column score can be configured and stored within MDM system 150 or within an auxiliary computer readable medium by the system programmer/administrator. The column score ranges from 0.0 to 1.0. Accordingly, because each of electronic dictionaries 135a-135g and attribute values within electronic dictionaries 135a-135g are associated to an attribute column, each of electronic dictionaries 135a-135g and attribute values within electronic dictionaries 135a-135g are also associated to a column position index and a column score. The column position index is the location of the attribute column within database entity table 155. The associations of each of electronic dictionaries 135a-135g to a column position index and a column score can be determined by program code functionality of document sensitivity computing program 130. Furthermore, the column score represents a level of importance, in regard to data security, that an enterprise places on the identified terms. Also, since the identified terms match to a certain extent with attribute values within one of electronic dictionaries 135a-135g, the identified terms are also each associated to an attribute column, a column position index, and a column score. The associations of each of the identified terms to an attribute column, a column position index, and a column score can be obtained by document sensitivity computing program 130 from information extraction program 140.

As mentioned above, information extraction program 140 uses a fuzzy matching technique to perform a comparison of electronic dictionaries 135a-135g with the specific terms extracted from the electronic document. The comparison can identify the specific terms that match to a certain extent with attribute values within one of electronic dictionaries 135a-135g, and also identify the column position index and the column score associated to each of the identified terms. Also, the column position index and the column score can be associated to the specific terms that are identified using regular expressions, because each regular expression can be associated with an attribute column. Document sensitivity computing program 130 can utilize each column position index and column score associated to the identified terms to perform subsequent operations that are needed to generate the value associated with the electronic document.

Moreover, in regard to the fuzzy matching technique, each of the specific terms extracted from the electronic document must have a certain amount of similarities with at least one of the attribute values within one of electronic dictionaries 135a-135g in order to be considered a match. In the disclosed embodiment, the extent to which a term must have similarities is defined by a configurable parameter value within document sensitivity computing program 130, wherein the configurable parameter value represents a threshold amount of differences. Specifically, if an amount of the differences between a specific term extracted and one of the attribute values within one of electronic dictionaries 135a-135g is less than or equal to the threshold amount of differences, then the specific term is considered a match. For example, a term "Josep" can be considered as a valid match for the name "Joseph" if the threshold amount of differences is 1 character. However, the term "Jose" would not be considered a valid match since the difference between "Jose" and "Joseph" is two characters. The configurable parameter value is adjustable by the system programmer/administrator according to technical requirements and/or data security policies of a particular enterprise that utilizes document sensitivity computing program 130.

Subsequent to document sensitivity computing program 130 performing fuzzy matching, document sensitivity computing program sends the identified terms to entity construction program 145 to perform record construction. Record construction refers to identifying one or more rows (i.e., entities) in database entity table 155 to which the identified terms are potentially associated. After receiving the identified terms, entity construction program 145 sends a query that includes the identified terms, to MDM system 150. In response to receiving the query, MDM system 150 determines one or more rows (i.e., entities) that may be associated to the identified terms, and returns the one or more rows to document sensitivity computing program 130. In scenarios where MDM system 150 is not able to determine a row associated to one of the identified terms, then no row is returned to document sensitivity computing program 130 for that identified term.

Next, document sensitivity computing program 130 performs additional processing to determine whether the one or more rows returned, if any, by MDM system 150 are actually associated to any of the identified terms. The additional processing includes matching each of the identified terms to attribute values represented within the one or more rows in database entity table 155. If no rows are returned then the additional processing is not performed.

Furthermore, each row in database entity table 155 has a row position index and a row score, wherein the row score can be configured and stored within MDM system 150 or within an auxiliary computer readable medium, by the system programmer/administrator. The row score ranges from 0.0 to 1.0. Moreover, the row position index is the location of a row in database entity table 155, and the row score represents a level of importance that an enterprise places on the identified terms extracted from the electronic document that are associated to the row. Document sensitivity computing program 130 includes functionality that can determine the row position index and the row score of each row that is actually associated with the identified terms, and utilize the row position index and the row score to perform subsequent operations that are needed to generate the value associated with the electronic document.

Specifically, to generate the value associated with the electronic document, document sensitivity computing program 130 computes a first product of the column score and the row score if the row score is determined, for each of the identified terms to obtain sub-scores. Otherwise, if a row score is not determined for one of the identified terms, then the sub-score for that identified term is merely the column score. In addition, a sub-score of an identified term is discarded if document sensitivity computing program 130 determines that the particular end-user attempting to access the electronic document has complete data access rights to an attribute value represented in database entity table 155, wherein based on the fuzzy matching technique the attribute value matches to the identified term. Particularly, document sensitivity computing program 130 can determine whether the particular end-user has complete data access rights to an attribute value represented in database entity table 155 by using the row position index and column position index that are associated to the attribute value to verify access control list 152. Access control list 152 specifies a set of row position indexes and column position indexes that the particular end-user has access to. In alternative embodiments, document sensitivity computing program 130 can be configured to obtain only one sub-score for any of the identified terms that occur more than once in the electronic document.

After obtaining the sub-scores document sensitivity computing program 130 computes normalized sub-scores by subtracting each of the sub-scores that have not been discarded, from 1.0. Subsequently, document sensitivity computing program 130 computes a second product by multiplying each of the normalized sub-scores together, wherein if there is only one normalized sub-score then the second product is the one normalized sub-score. Next, document sensitivity computing program 130 computes the difference between 1.0 and the second product, to obtain the value associated with the electronic document. The operations mentioned above that are used to generate the value associated with the electronic document can be represented with the expression $S(D,U)=1-\Pi_{(i,j) \in I(D)}(1-S(i, j, U))$, wherein letter S represents the value associated with the electronic document, letter D represents the electronic document, letter U represents the particular end-user that is attempting to access the electronic document, letter i is the row position index, letter j is the column position index, and I(D) represents a group of terms in the electronic document. Document sensitivity computing program 130 can send the value associated with the electronic document to sensitive document handler program 160. Sensitive document handler program 160 can utilize the value associated with the electronic document to perform further action that can include redaction of the electronic document and/or notification to a system programmer/administrator of attempted access to the electronic document.

Figure 2:
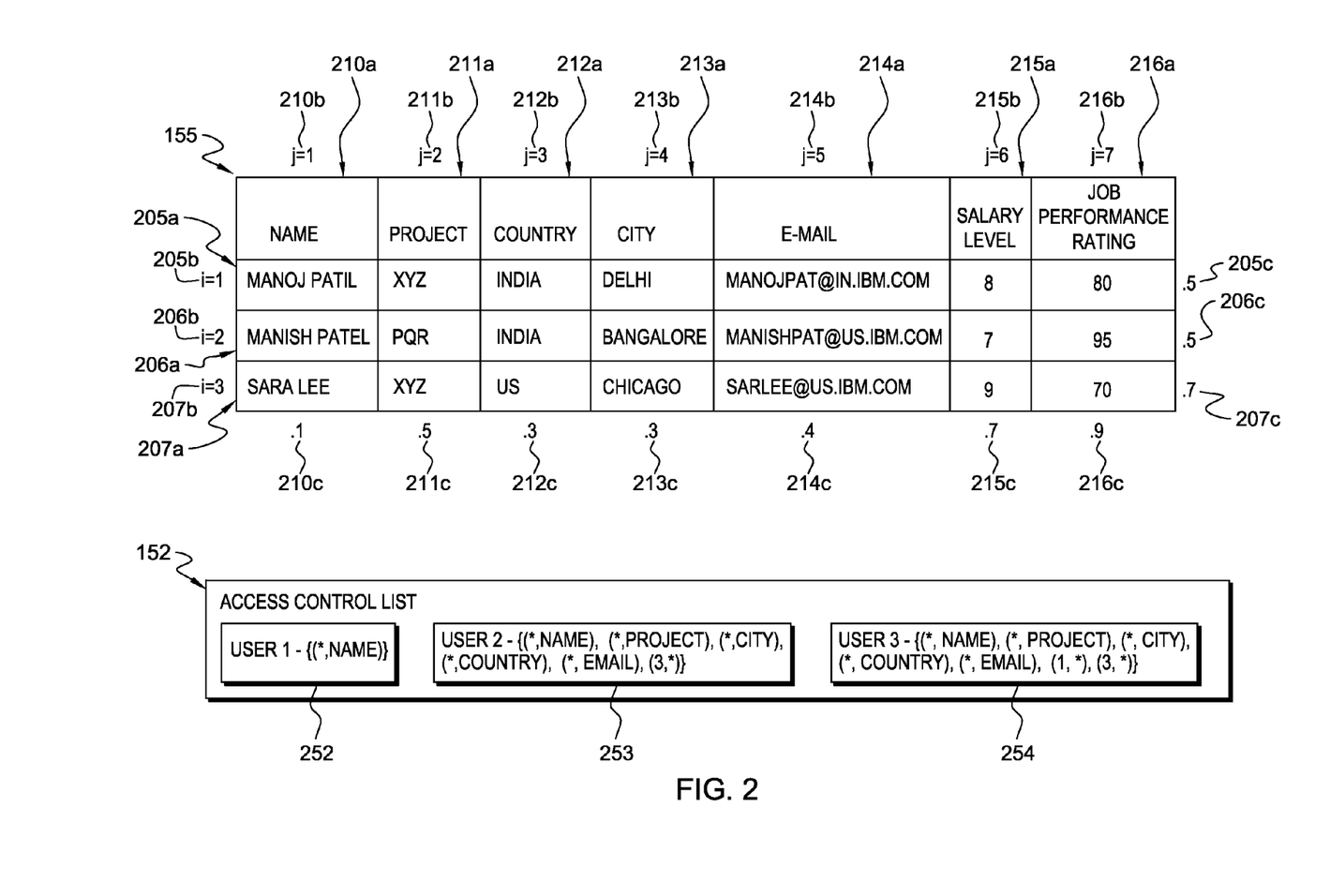
FIG. 2 depicts a database entity table having information, and an access control list that specifies data access rights of end-users to the information according to an embodiment of the present invention.

FIG. 2 depicts database entity table 155 that contains information. Access control list 152 specifies data access rights of end-users to the information in database entity table 155. In the disclosed embodiment, database entity table 155 includes three rows (i.e., entities) 205a-207a having respective row position indexes 205b-207b and respective row scores 205c-207c. Database entity table 155 further includes seven attribute columns 210a-216a having respective column position indexes 210b-216b and column scores 210c-216c.

Moreover, the particular end-user's ability to access electronic documents containing the information within database entity table 155 can be based on row scores 205c-207c if any are determined, column scores 210c-216c, and access control list 152 having access control definitions 252-254. Access control definitions 252-254 can each be assigned to the particular end-user based on technical requirements and/or data security policies of an enterprise. For example, if the particular end-user is assigned access control definition 252, then the particular end-user has data access rights to view the identified terms in an electronic document that are associated to information within attribute column 210a of rows 205a-207a. In addition, if the particular end-user is assigned access control definition 253, then the particular end-user has data access rights to view the identified terms in an electronic document that are associated to information within attribute columns 210a-214a of rows 205a-207a, and within attribute columns 210a-216a of row 207a. In still another example, if the particular end-user is assigned access control definition 254, then the particular end-user has data access rights to view the identified terms in an electronic document that correspond to information within attribute columns 210a-214a of rows 205a-207a, and within attribute columns 210a-216a of rows 205a and 207a. Thus, the asterisk symbols in access control definitions 252-254 can be used to give the particular end-user complete data access rights to one or more of rows 205a-207a and/or one or more of columns 210a-216a.

Figure 3:
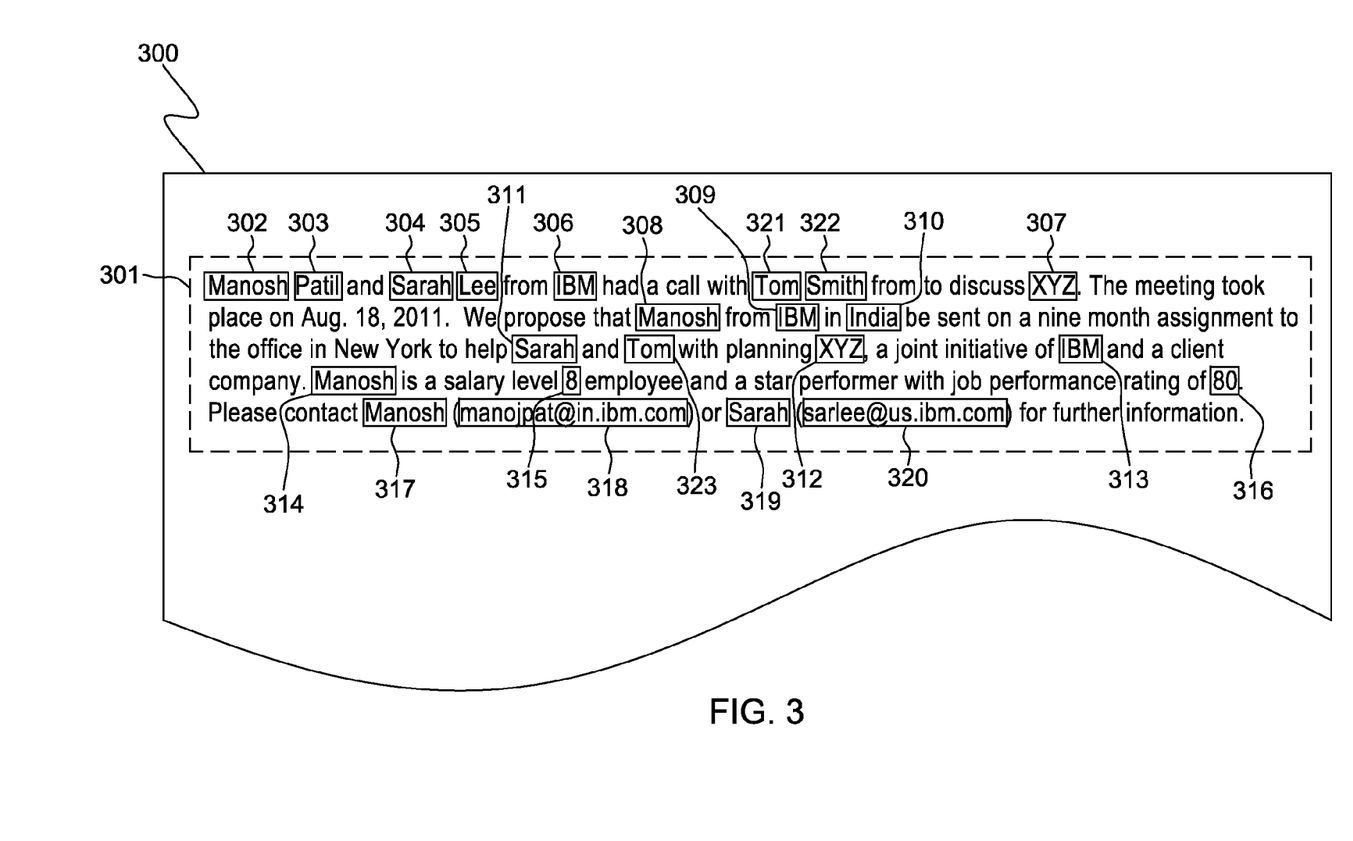
FIG. 3 depicts an electronic document having information that includes a group of terms, wherein the group of terms include terms that can be in the database entity table of FIG. 2 according to an embodiment of the present invention.

FIG. 3 depicts electronic document 300 having information that includes a group of terms 301, wherein group of terms 301 include terms 302-323 that can be in database entity table 155. Document sensitivity computing program 130 can generate a value associated with electronic document 300 based on the information within electronic document 300, associated structured data in MDM system 150, and a particular end-user that is attempting to access electronic document 300. The value associated with electronic document 300, generated by document sensitivity computing program 130, is utilized to classify electronic document 300 for data security purposes that include redacting electronic document 300 and/or notifying the system programmer/administrator of the particular end-user's attempted access to electronic document 300.

Figure 4A:
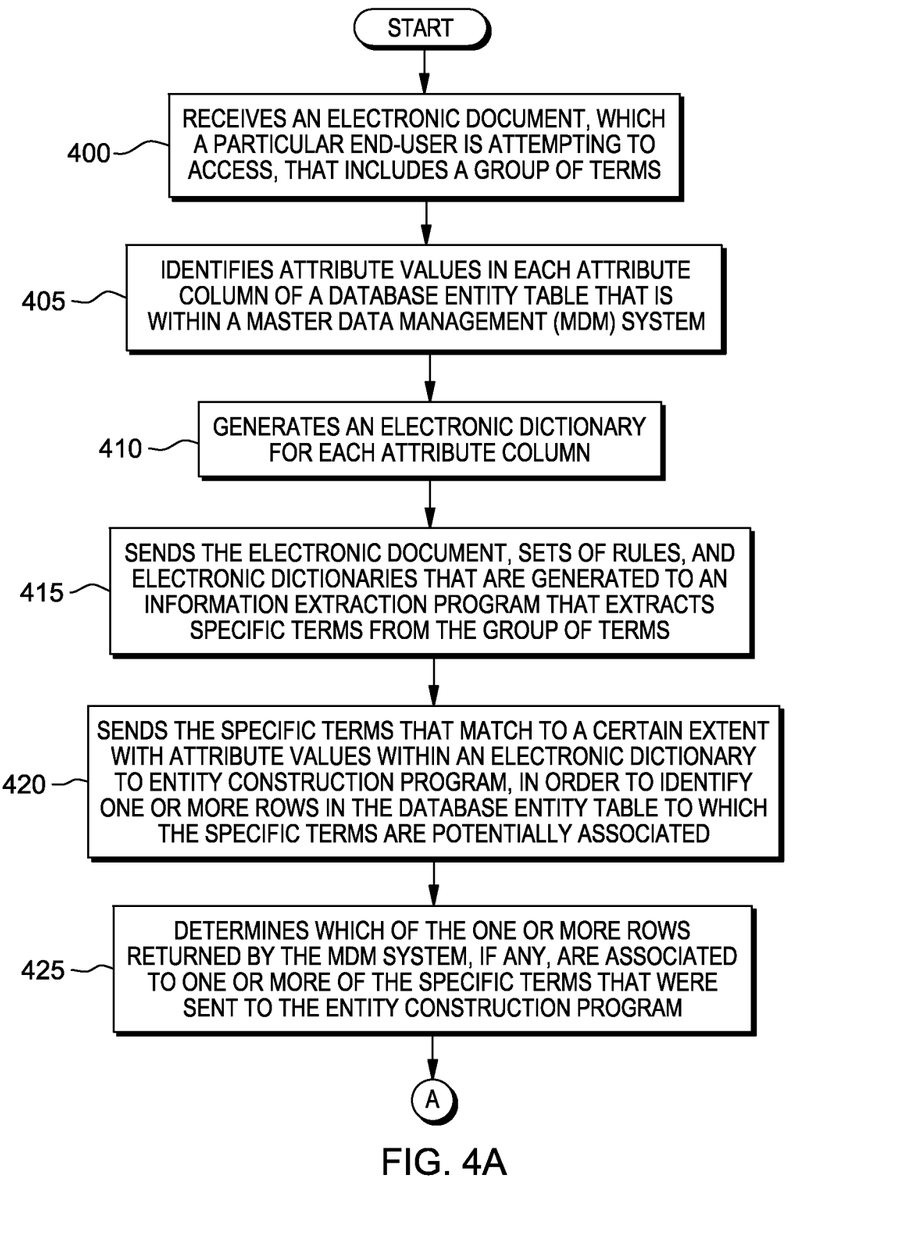
FIGS. 4A and 4B are flowcharts illustrating operations of document sensitivity computing program generating the value associated with the electronic document of FIG. 3 according to an embodiment of the present invention.
Figure 4B:
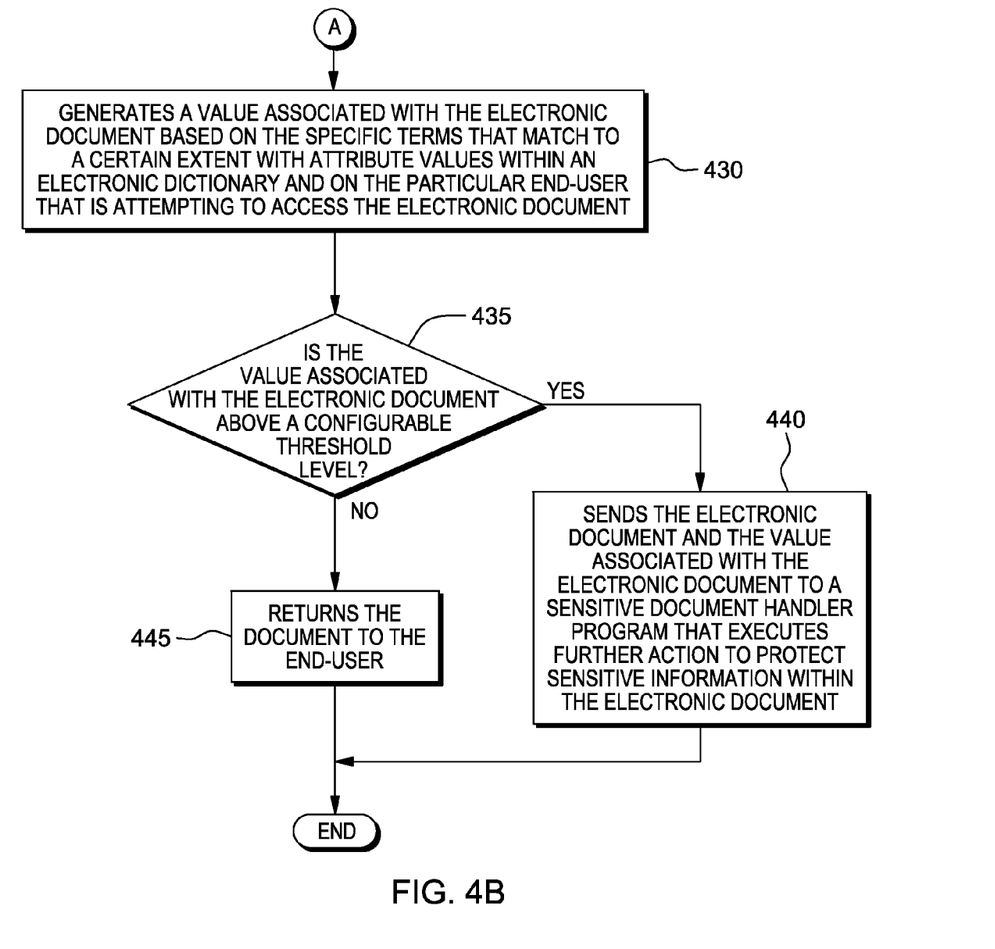

FIGS. 4A and 4B are flowcharts illustrating operations of document sensitivity computing program 130 generating the value associated with electronic document 300 based on the information within electronic document 300, associated structured data in MDM system 150, and a particular end-user that is attempting to access electronic document 300. Specifically, in the disclosed embodiment, a particular end-user is utilizing application program 110 and is attempting to access electronic document 300 through application program 110. As a result, application program 110 sends a data request via network 112 to server computer 115 in order to retrieve electronic document 300 for the particular end-user. The data request includes data that identifies the particular end-user and the electronic document 300 that the particular end-user is attempting to access. Query handler 125 receives the data request, and in response to receiving the data request query handler 125 invokes a computer command to retrieve the electronic document 300 from document repository 120.

Next, query handler 125 sends electronic document 300 to document sensitivity computing program 130. Document sensitivity computing program 130 receives electronic document 300, which a particular end-user is attempting to access, that includes the group of terms 301 (block 400). In addition, document sensitivity computing program 130 identifies attribute values in each attribute column 210a-216a of database entity table 155 that is within MDM system 150 (block 405). Subsequently, document sensitivity computing program 130 generates an electronic dictionary 135a-135g for each attribute column 210a-216a respectively (block 410).

Thus, each of electronic dictionaries 135a-135g is associated with respective attribute columns 210a-216a of database entity table 155, based on program code functionality of document sensitivity computing program 130. Specifically, each of electronic dictionaries 135a-135g is an array containing attribute values, wherein the attribute values are also represented in respective attribute columns 210a-216a. For example, electronic dictionary 135a is an array containing attribute values that are also represented in attribute column 210a, electronic dictionary 135b is an array containing attribute values that are also represented in attribute column 211a, electronic dictionary 135c is an array containing attribute values that are also represented in attribute column 212a, and so forth. In the disclosed embodiment, there is only one database entity table 155 having seven attribute columns 210a-216a. As a result, document sensitivity computing program 130 generates only seven electronic dictionaries 135a-135g. However, in other embodiments there can be more than one database entity table having one or more attribute columns, which would require additional electronic dictionaries to be generated.

Subsequent to generating electronic dictionaries 135a-135g, document sensitivity computing program 130 sends electronic document 300, sets of rules, and electronic dictionaries 135a-135g that are generated to information extraction program 140 that extracts specific terms 302-323 from the group of terms 301 (block 415). Particularly, information extraction program 140 is a software program having functionality that can receive electronic document 300 and sets of rules, and extract specific terms 302-323 from the group of terms 301 based on the sets of rules. In alternative embodiments, the sets of rules can be configured based on regular expressions or electronic dictionaries 135a-135g. To extract specific terms 302-323 from the group of terms using the sets of rules configured based on electronic dictionaries 135a-135g, information extraction program 140 compares each term in the group of term 301 with each electronic dictionary 135a-135g, by utilizing a fuzzy technique. Thus, information extraction program 140 has fuzzy matching functionality that can be configured to access electronic dictionaries 135a-135g. Based on the comparisons, information extraction program 140 identifies specific terms 302-320 that match to a certain extent with attribute values within one of electronic dictionaries 135a-135g that was generated.

Moreover, each of the electronic dictionaries 135a-135g are associated with respective attribute columns 210a-216a of database entity table 155. Since specific terms 302-320 match to a certain extent with attribute values within one of electronic dictionaries 135a-135g, each of specific terms 302-320 are also associated with one of electronic dictionaries 135a-135g and one of respective attribute columns 210a-216a. Attribute columns 210a-216a have column position indexes 210b-216b and column scores 210c-216c, respectively. The column scores 210c-216c can be configured within MDM system 150 or within an auxiliary computer readable medium by the system programmer/administrator.

Accordingly, since electronic dictionaries 135a-135g and specific terms 302-320 are each associated with one of attribute columns 210a-216a, they also are each associated with one of respective column position indexes 210b-216b and one of respective column scores 210c-216c. For example, electronic dictionary 135a and specific terms 302-305, 308, 311, 314, 317 and 319 that match to a certain extent with attribute values within electronic dictionary 135a, are all associated with attribute column 210a. As a result, electronic dictionary 135a and specific terms 302-305, 308, 311, 314, 317 and 319 are also associated with column position index 210*b* and column score 210*c*. In the disclosed embodiment, information extraction program 140 determines column position indexes 210*b*-216*b* that are associated to each of specific terms 302-320, by utilizing functionality of the fuzzy matching. The column position indexes 210*b*-216*b* that are associated to each of specific terms 302-320 may be stored on a suitable computer-readable tangible storage device connected to server computer 115, by document sensitivity computing program 130. Furthermore, document sensitivity computing program 130 can utilize column position indexes 210*b*-216*b* to obtain column scores 210*c*-216*c* associated to specific terms 302-320.

Subsequent to information extraction program 140 performing fuzzy matching information extraction program 140 sends specific terms 302-320 to document sensitivity computing program 130. Document sensitivity computing program 130 sends specific terms 302-320 to entity construction program 145, in order to identify one or more rows 205*a*-207*a* in database entity table 155 to which specific terms 302-320 are potentially associated (block 420). The process of entity construction program 145 identifying one or more rows 205*a*-207*a* in database entity table 155 to which specific terms 302-320 are potentially associated, is referred to as record construction. Thus, after entity construction program 145 receives specific terms 302-320, entity construction program 145 sends a query that includes specific terms 302-320 to MDM system 150. In response to receiving the query, MDM system 150 determines one or more rows 205*a*-207*a* that may be associated to specific terms 302-320, and MDM system 150 is configured to return the one or more rows 205*a*-207*a* to document sensitivity computing program 130. Next, document sensitivity computing program 130 determines which of rows 205*a*-207*a* returned by MDM system 150, if any as a result of the record construction, are associated to one or more of specific terms 302-320 that were sent to entity construction program 145 (block 425). Specific terms 302-320 that are associated to one of rows 205*a*-207*a* are also associated to one of row position indexes 205*b*-207*b* and one of row scores 205*c*-207*c*, respectively. For example, if specific term 302 is associated to row 205*a*, then specific term 302 is also associated to row position index 205*b* and row score 205*c*.

In the disclosed embodiment, document sensitivity computing program 130 has functionality that can determine the row position indexes 205*a*-207*a* that are associated to each of specific terms 302-320. The row position indexes 205*b*-207*b* associated to each of the specific terms 302-320 may be stored on a suitable computer-readable tangible storage device connected to server computer 115, by document sensitivity computing program 130. Furthermore, document sensitivity computing program 130 can utilize row position indexes 205*a*-207*a* that are associated to specific terms 302-320 to obtain respective row scores 205*c*-207*c* that are associated to specific terms 302-320. In addition, document sensitivity computing program 130 can utilize column scores 210*c*-216*c* and row scores 205*c*-207*c* to perform subsequent operations that are needed to generate a value associated with the electronic document 300.

Subsequent to determining which of rows 205*a*-207*a* are associated to one or more of specific terms 302-320, document sensitivity computing program 130 generates a value associated with electronic document 300 based on specific terms 302-320 and on the particular end-user that is attempting to access electronic document 300 (block 430). Specifically, document sensitivity computing program 130 can utilize the column position indexes 210*b*-216*b* and row position indexes that are associated to specific terms 302-320, to locate and retrieve the column scores 210*c*-216*c* and row scores 205*c*-207*c* that are associated to specific terms 302-320. To generate the value associated with electronic document 300, document sensitivity computing program 130 computes a first product of the column score and the row score if it is determined, for each of specific terms 302-320 to obtain sub-scores. However, if a row score is not determined for one of specific terms 302-320, then the sub-score for that identified term is merely the column score. Moreover, if document sensitivity computing program 130 determines that the particular end-user attempting to access electronic document 300 has complete data access rights to certain attribute values represented in database entity table 155, and based on the fuzzy matching functionality one or more specific terms 302-320 match to the certain attribute values, then the sub-scores for the one or more specific terms 302-320 that match to the certain attribute values will be discarded. Specifically, document sensitivity computing program 130 can determine whether the particular end-user attempting to access electronic document 300 has complete data access rights to an attribute value represented in database entity table 155, by verifying access control list 152. In alternative embodiments, document sensitivity computing program 130 can be configured to obtain only one sub-score for any of specific terms 302-320 that occur more than once in electronic document 300.

After obtaining the sub-scores document sensitivity computing program 130 computes normalized sub-scores by subtracting each of the sub-scores that have not been discarded, from 1.0. Subsequently, document sensitivity computing program 130 computes a second product by multiplying each of the normalized sub-scores together, wherein if there is only one normalized sub-score then the second product is the one normalized sub-score. Next, document sensitivity computing program 130 computes the difference between 1.0 and the second product, to obtain the value associated with electronic document 300.

Next, if document sensitivity computing program 130 determines that the value associated with electronic document 300 is above a configurable threshold level (the "YES" branch of decision block 435), then document sensitivity computing program 130 sends electronic document 300 and the value associated with electronic document 300 to sensitive document handler program 160 that executes further action to protect sensitive information within electronic document 300 (block 440). Specifically, if the configurable threshold level is exceeded then this indicates that access to electronic document 300 by the particular end-user may violate data security policies of a particular enterprise that is utilizing document sensitivity computing program 130. Therefore, further action can include redaction of the electronic document and/or notification to a system programmer/administrator of attempted access to the electronic document 300, which can protect sensitive information within electronic document 300. Subsequent to document sensitivity computing program 130 sending electronic document 300 to sensitive document handler program 160, further processing by document sensitivity computing program 130 ends.

However, if document sensitivity computing program 130 determines that the value associated with electronic document 300 is not above the configurable threshold level (the "NO" branch of decision block 435) then document sensitivity computing program 130 returns electronic document 300 to the particular end-user (block 445). Thus, if the configurable threshold level is not exceeded then this indicates that access to electronic document 300 by the particular end-user does not violate data security policies of a particular enterprise that is utilizing document sensitivity computing program 130. After document sensitivity computing program 130 returns the electronic document 300 to the particular end-user, further processing by document sensitivity computing program 130 ends.

Figure 5:
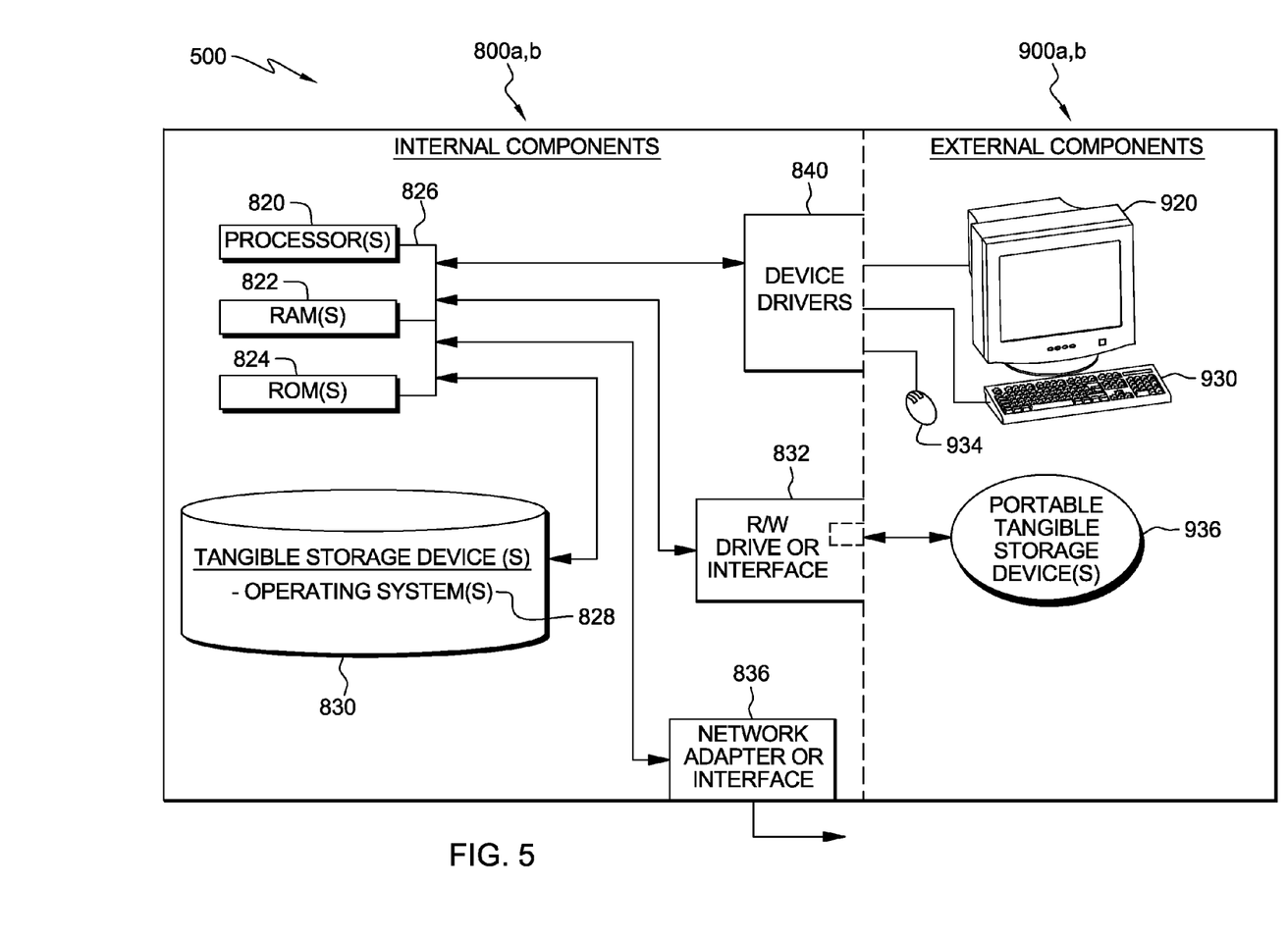
FIG. 5 is a block diagram depicting internal and external components of a computer having the document sensitivity computing program of FIG. 1 according to an embodiment of the present invention.

FIG. 5 is block diagram 500 depicting a set of internal components 800a and a set of external components 900a that correspond to server computer 115, as well as a set of internal components 800b and a set of external components 900b that correspond to client computer 105. Internal components 800a and 800b each include one or more processors 820, one or more computer-readable RAMs 822, one or more computer-readable ROMs 824 on one or more buses 826, and one or more operating systems 828 and one or more computer-readable tangible storage devices 830. The one or more operating systems 828, application program 110 in client computer 105; and document repository 120, query handler 125, MDM system 150, programs 130, 140, 145, and 160 in server computer 115 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a and 800b includes a R/W drive or interface 832 to read from and write to one or more portable computer-readable tangible storage devices 936 such as CD-ROM, DVD, memory stick, magnetic tape, magnetic disk, optical disk or semiconductor storage device. Application program 110 in client computer 105; and document repository 120, query handler 125, MDM system 150, programs 130, 140, 145, and 160 in server computer 115 can be stored on one or more of the respective portable computer-readable tangible storage devices 936, read via the respective R/W drive or interface 832 and loaded into the respective hard drive 830.

Furthermore, each set of internal components 800a and 800b also includes a network adapter or interface 836 such as TCP/IP adapter card, wireless wi-fi interface card, or 3G or 4G wireless interface card or other wired or wireless communication link. Application program 110 in client computer 105; and query handler 125, programs 130, 140, 145, and 160 in server computer 115 can be downloaded to respective computers 105 and 115 from an external computer or external storage device via a network (for example, the Internet, a LAN, or a WAN) and respective network adapters or interfaces 836. From the network adapter or interface 836, application program 110 in client computer 105; and query handler 125, programs 130, 140, 145, and 160 in server computer 115 are loaded into respective hard drive 830. The network may comprise copper wires, optical fibers, wireless transmission, routers, firewalls, switches, gateway computers and/or servers.

Each set of external components 900a and 900b can include a computer display monitor 920, a keyboard 930, and a computer mouse 934. External components 900a and 900b can also include touch screens, virtual keyboards, touch pads, pointing devices, and other human interface devices. Each set of internal components 800a and 800b also includes device drivers 840 to interface to computer display monitor 920, keyboard 930 and computer mouse 934. The device drivers 840, R/W drive or interface 832 and network adapter or interface 836 comprise hardware and software in which the software is stored in computer-readable tangible storage device 830 and/or ROM 824.

It should be appreciated that FIG. 5 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

In accordance with the foregoing, a method, computer system, and computer program product have been disclosed for generating a value associated with an electronic document, based on information within the electronic document, associated structured data in a master data management system, and a particular end-user that is attempting to access the electronic document. However, numerous modifications substitutions can be made without deviating from the scope of an embodiment of the invention. Therefore, one or more embodiments of the invention have been disclosed by way of example and not limitation.

What is claimed is:

1. A computer program product for generating a value associated with an electronic document comprising:
a computer readable storage device and program instructions stored on the computer readable storage device, the program instructions comprising:
program instructions to receive an electronic document;
program instructions to receive data that identifies an end-user that is attempting to access the electronic document;
program instructions to determine, by fuzzy matching, a threshold number of similarities between one or more terms in the electronic document and one or more attribute values in an electronic dictionary;
program instructions to associate one or more attribute scores associated with the one or more attribute values in the electronic dictionary with the one or more terms in the electronic document, responsive to the determining; and
program instructions to assign a document score to the electronic document based, at least in part, on the one or more attribute scores, wherein the value is specific to the end-user.

2. The computer program product of claim 1, wherein the program instructions to associate the scores with the terms within the electronic document further comprises sending the electronic document to an information extraction program.

3. The computer program product of claim 1, wherein the program instructions to generate the value associated with the electronic document comprises performing computations on the associated scores to obtain the value.

4. The computer program product of claim 1, wherein the value associated with the electronic document is utilized to classify the electronic document for data security purposes.

5. The computer program product of claim 1, wherein the attribute scores in electronic dictionary are based, at least in part, on the position of one or more key terms in a table, and wherein the one or more key terms are substantially similar to the one or more attribute values in the electronic dictionary.

6. The computer program product of claim 5, wherein the table has one or more columns and one or more rows, wherein the one or more columns have an associated column score, and wherein the one or more rows have an associated column score.

7. The computer program product of claim 6, wherein the attribute scores in the electronic dictionary are based, at least in part, on the column score and the row score associated with the one or more key terms.

8. A computer system for generating a value associated with an electronic document comprising:
one or more processors, one or more computer readable memories, one or more computer readable storage media, and program instructions stored on the one or more storage media for execution by the one or more processors via the one or more memories, the program instructions comprising:
program instructions to receive an electronic document;
program instructions to receive data that identifies an end-user that is attempting to access the electronic document;
program instructions to determine, by fuzzy matching, a threshold number of similarities between one or more terms in the electronic document and one or more attribute values in an electronic dictionary;
program instructions to associate one or more attribute scores associated with the one or more attribute values in the electronic dictionary with the one or more terms in the electronic document, responsive to the determining; and
program instructions to assign a document score to the electronic document based, at least in part, on the one or more attribute scores, wherein the value is specific to the end-user.

9. The computer system of claim 8, wherein the program instructions to associate the scores with the terms within the electronic document further comprises sending the electronic document to an information extraction program.

10. The computer system of claim 8, wherein the program instructions to generate the value associated with the electronic document comprises performing computations on the associated scores to obtain the value.

11. The computer system of claim 8, wherein the value associated with the electronic document is utilized to classify the electronic document for data security purposes.

12. The computer system of claim 8, wherein the attribute scores in electronic dictionary are based, at least in part, on the position of one or more key terms in a table, and wherein the one or more key terms are substantially similar to the one or more attribute values in the electronic dictionary.

13. The computer system of claim 12, wherein the table has one or more columns and one or more rows, wherein the one or more columns have an associated column score, and wherein the one or more rows have an associated column score.

14. The computer system of claim 13, wherein the attribute scores in the electronic dictionary are based, at least in part, on the column score and the row score associated with the one or more key terms.

* * * * *